(12) United States Patent
Gong

(10) Patent No.: US 8,658,302 B2
(45) Date of Patent: Feb. 25, 2014

(54) BATTERY LATCH STRUCTURE

(75) Inventor: Gaochao Gong, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 1457 days.

(21) Appl. No.: 11/766,097

(22) Filed: Jun. 20, 2007

(65) Prior Publication Data

US 2008/0254349 A1 Oct. 16, 2008

(30) Foreign Application Priority Data

Apr. 11, 2007 (CN) .......................... 2007 2 0119450

(51) Int. Cl.
*H01M 2/10* (2006.01)
(52) U.S. Cl.
USPC ........................................................... 429/97
(58) Field of Classification Search
USPC ...................... 429/96, 97, 100, 123; 206/703; D13/120
See application file for complete search history.

(56) References Cited

FOREIGN PATENT DOCUMENTS

WO WO 2006014112 A1 * 2/2006

OTHER PUBLICATIONS

Definition of Pin retrieved from Dictionary.com on Nov. 19, 2010.*
Synonyms of "Compartment" retreived from Dictionary.com on Apr. 13, 2011.*

* cited by examiner

*Primary Examiner* — Ula C Ruddock
*Assistant Examiner* — Lisa S Park Gehrke
(74) *Attorney, Agent, or Firm* — Global IP Services; Tianhua Gu

(57) ABSTRACT

The present invention discloses a battery latch structure, wherein a battery slot for receiving a battery is located on the main body, a first end of said battery is latched to a first end of said slot through a first clamp structure, and a second end of said battery is latched to a second end of said slot through a second clamp structure. The second clamp structure includes a second fixed clamp located on the left and right sides of the second end of said slot, and a battery latch, a spring and two battery lock members located at the second end of said battery. The battery latch is located at the second end of the battery and may be slid upwards and downwards to be moveably connected with the two battery lock members. The spring is located between the two battery lock members. The said spring can push the two battery lock members protruding leftwards and rightwards respectively to insert into the second clamp. The said battery latch can be moved upwards by the action of outside force, to release the two battery lock members from the second clamp. The advantages of the present invention are simple in structure and convenient for operation.

4 Claims, 4 Drawing Sheets

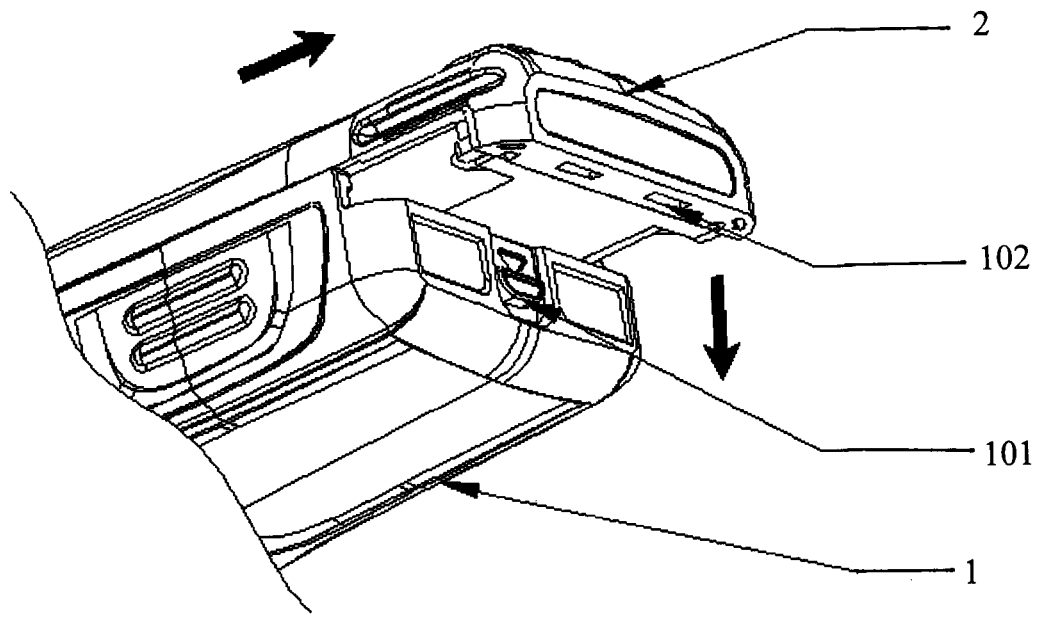
Fig. 1    (PRIOR ART)
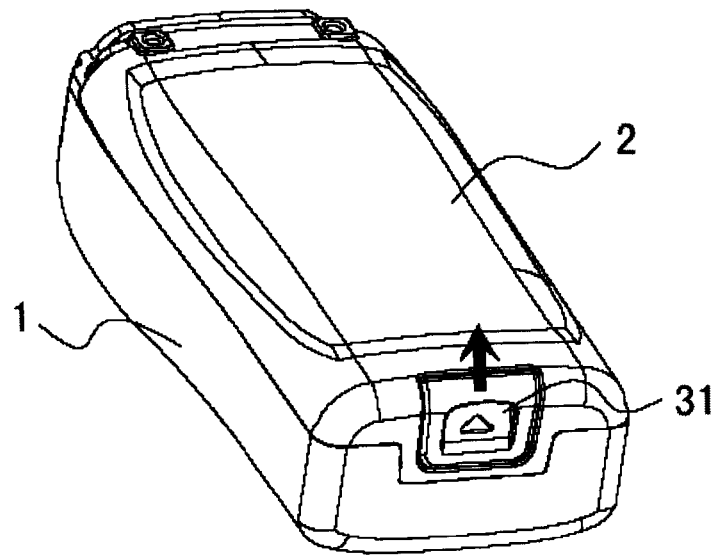
Fig. 2

BATTERY LATCH STRUCTURE

CROSS REFERENCE TO RELATED PATENT APPLICATION

This patent application claims the priority of the Chinese patent application No. 200720119450.8, filing date of Apr. 11, 2007.

TECHNICAL FIELD OF THE INVENTION

This invention refers to a battery latch structure between a battery and a main body of a device which is supplied by battery, and more particularly to such a battery latch structure for mobile communication devices such as two-way radio.

BACKGROUND OF THE INVENTION

Mobile communication devices such as two-way radio, mobile phone, have become an inevitable part in our daily life. Since these devices are frequently applied to mobile use, higher quality and durability are required for these devices.

Generally speaking, such mobile communication devices as two-way radio or mobile phone are mainly composed of a main body of the device and a battery. Slot locates on the two sides of the main body, for users to slide battery into and then attach the battery. Then the main body of the device is supplied by the battery for communication. When in use, on the one hand, the battery shall be removed or replaced frequently, thus the battery must be detachable from the main body. On the other hand, the battery and the main body must be in secure connection, to prevent the battery and the main body from accidental separation, which shall cause communication failed.

To solve this issue, a battery latch structure is applied to the conventional devices, shown as FIG. 1, wherein a battery latch 101 is attached on the main body 1, and a slot 102 corresponding to the battery latch 101 is located at the bottom of the battery 2. When the battery latch is pushed upwards, the battery is secured with the main body, and then the battery will not be separated from the main body by accidental drop. Sliding the battery latch downwards will cause the battery slide away from the main body to be charged or replaced. However, this kind of design has some disadvantages. Since the battery must be slid horizontally while the battery latch must be pushed downwards when removing the battery, the operation is complicate and inconvenient. Additionally, sliding the battery horizontally may cause your fingers injured. Moreover, the sliding connection between the main body and the battery may be over-tight or over-loose caused by the design and the usage, which shall affect the use of product.

SUMMARY OF THE INVENTION

The present invention is to solve issues such as complicated operation and poor reliability involved in the conventional battery latch structures, and to provide a new battery latch structure, which offers secure connection between the battery and the mobile communication device, and more convenient removing of the battery. To solve the foregoing issues, the present invention provides a battery latch structure, wherein a battery slot for receiving a battery is located on the main body, a first end of said battery is latched to a first end of said slot through a first clamp structure, and a second end of said battery is latched to a second end of said slot through a second clamp structure. The second clamp structure includes a second fixed clamp located on the left and right sides of the second end of said slot, and a battery latch, a spring and two battery lock members located at the second end of said battery. The battery latch is located at the second end of the battery and may be slid upwards and downwards to be moveably connected with the two battery lock members. The spring is located between the two battery lock members. The said spring can push the two battery lock members protruding leftwards and rightwards respectively to insert into the second clamp. The said battery latch can be moved upwards by the action of outside force, to release the two battery lock members from the second clamp.

This structure facilitates users to easily attach or remove the battery. The present battery latch structure is simple in design, to ensure a secure connection between the battery and the main body, and facilitates the operation of the users, further helps to prevent said injury.

Advantageously, the said two battery lock members are arranged symmetrically, and each battery lock member includes a vertical part and a horizontal part integrated with the vertical part, wherein the vertical part is latched to the battery latch to convert the upward and downward movement of the battery latch to the leftward and rightward movement of the battery lock member, thereby cause the horizontal part of the battery lock member may be stretched or retracted leftwards and rightwards to be inserted into or released from the second clamp. This method could result in more reliable connection between the battery and the main body.

Advantageously, a slot for installing the vertical part of said two battery lock members and said spring is arranged under the said battery latch. The slot further comprises two symmetrical latching slopes located at the left and right inner sides of said slot. The outer side of the vertical part of each battery lock member is formed with a corresponding latching slope. The said battery latch is cooperated with the two battery lock members through their respective slopes.

Advantageously, the outer end of the horizontal part of each battery lock member is formed with a slope for sliding into the second clamp. Advantageously, the inner side of the vertical part of each battery lock member is provided with a pin for installing the said spring. Both ends of said spring are attached to a pin respectively. Advantageously, the first clamp structure includes a first fixed clamp located at the first end of said slot, and a first fixed lock member located at the first end of battery.

BRIEF DESCRIPTION OF THE DRAWINGS

FIG. 1 shows a structural diagram of a conventional battery latch structure.

FIG. 2 is a schematic view of a battery latch structure applied to two-way radio in accordance with one embodiment of the present invention.

DETAILED DESCRIPTION OF THE PREFERRED EMBODIMENT

To make the technical issues that to be solved by the present invention, the technical solutions and effects more explicit, the detailed description of the present invention is given below combined with the drawings and embodiments. A preferred embodiment of the present invention is shown in FIGS. 2 to 9, wherein the device is a two-way radio, and a battery 2 is attached on the main body 1 through a battery latch structure.

Figure 3:
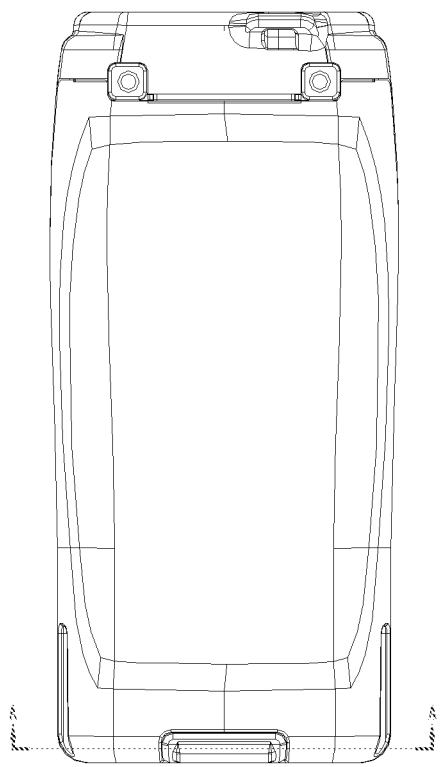
FIG. 3 shows the top view of FIG. 2.
Figure 4:
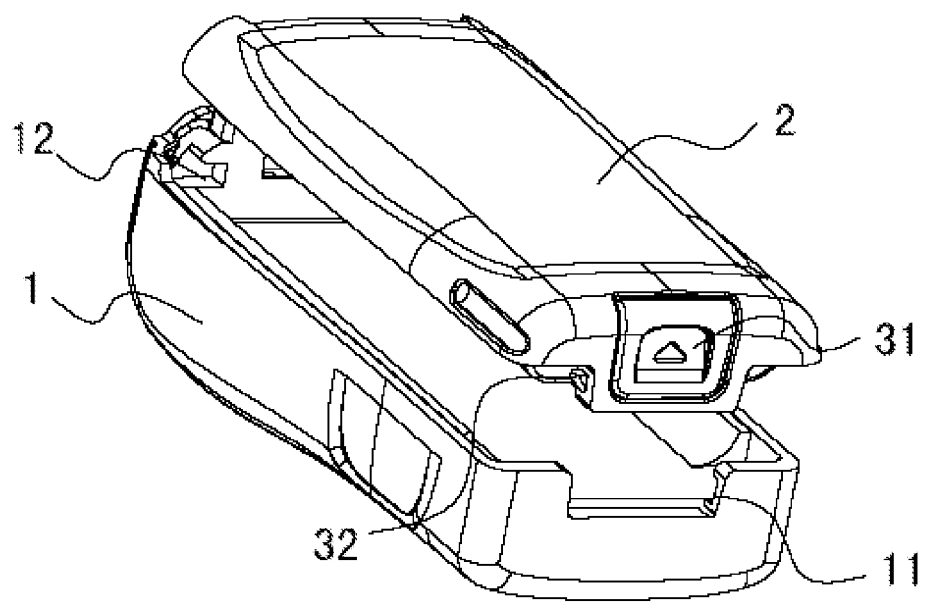
FIG. 4 is a schematic view of the embodiment shown in FIG. 2, with the battery removed.

As shown in FIGS. 2 to 4, in this preferred embodiment of the present invention, a recessed slot used for attaching the battery is located on the main body 1. When the battery is slid into the slot, it is integrated with the main body to form one unit. A first end of the battery (i.e. the top left end shown in FIG. 4) is latched to a first end of the slot through a first clamp structure, and a second end of the battery (i.e. the bottom right end shown in FIG. 4) is latched to a second end of said slot through a second clamp structure. As shown in FIG. 4, the first clamp structure includes a first fixed clamp 12 located at the first end of said slot, and a first fixed lock member (not shown in the figure) located at the first end of the battery. The said first clamp structure is substantially similar with the traditional type, and it is referred as a fixed type relative to the second clamp structure having several moveable parts.

Figure 5:
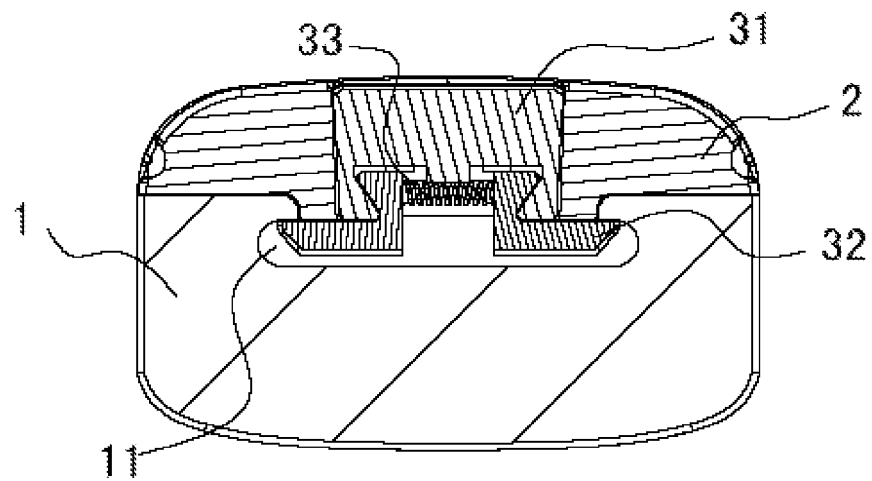
FIG. 5 shows an A-A sectional view of FIG. 3.
Figure 6:
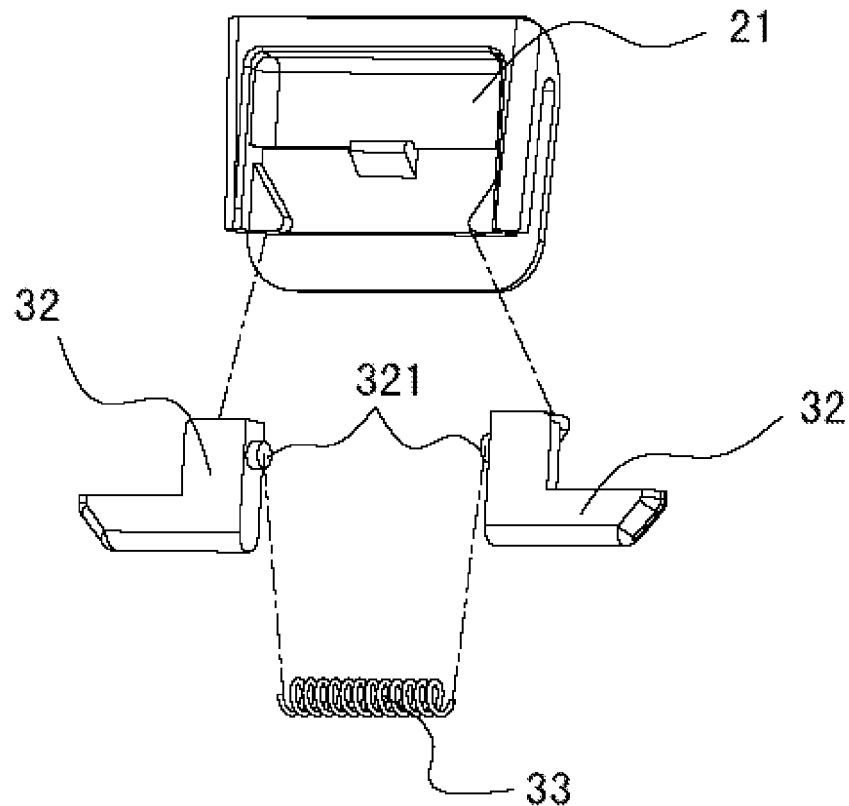
FIG. 6 shows an exploded view of the battery latch, battery clamp and spring in the embodiment shown in FIG. 2.

As shown in FIG. 4 to FIG. 6, the second clamp structure includes a second fixed clamp 11 located at the left and right sides of the second end of said slot, and a battery latch 31, a spring 33, and two battery lock members 32 located at the second end of the battery, wherein the battery latch 31 is located at the second end of the battery and may be slid upwards and downwards to be moveably connected with the two battery lock members 32. The spring 33 is located between the two battery lock members 32.

As shown in FIG. 5 to FIG. 6, the two battery lock members 32 are arranged symmetrically, and each battery lock member includes a vertical part and a horizontal part integrated with the vertical part, wherein the vertical part is latched to the battery latch 31 to convert the upward and downward movement of the battery latch to the leftward and rightward movement of the battery lock member, thereby cause the horizontal part of the battery lock member can be stretched or retracted leftwards and rightwards to be inserted into or released from the second clamp 11.

A slot 21 is located at the bottom of the battery 2, and the two battery lock members 32 are installed inside the slot 21 with the horizontal part protruding outside. As shown in FIG. 6, pins 321 are respectively provided on the opposite side surface of the two battery lock members 32, and the spring 33 is attached to the said pins 321. The vertical parts of the battery lock members 32 are latched to the battery latch 31, and the horizontal parts protrude from the two sides of the slot 21 and can be inserted into or released from the second clamp 11. This method could result in more reliable connection between the battery 2 and the main body 1.

As shown in FIG. 5, the latched surfaces between the battery lock member 32 and the battery latch 31 are matched slopes. When the battery latch 31 is slid upwards, action between the matched slopes makes the two battery lock members 32 move towards each other to compress the spring 33, and thus the battery lock members 32 are released from the second clamp 11. In addition, the outer end of the horizontal part of the battery lock members 32 are also a slope. When attaching the battery, the battery lock members 32 can be easily retracted and then protrude towards two sides after sliding into the second clamp 11 by pressing the bottom end of the battery.

Figure 7:
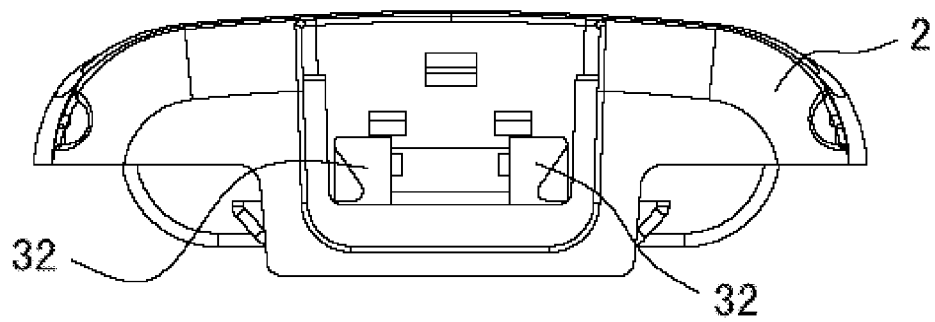
FIG. 7 shows an assembled view of the battery clamp in the embodiment shown in FIG. 2.
Figure 8:
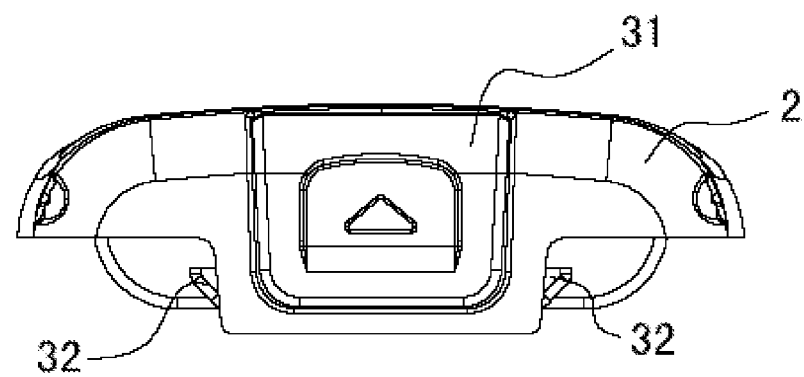
FIG. 8 shows an assembled view of the battery latch in the embodiment shown in FIG. 2.
Figure 9:
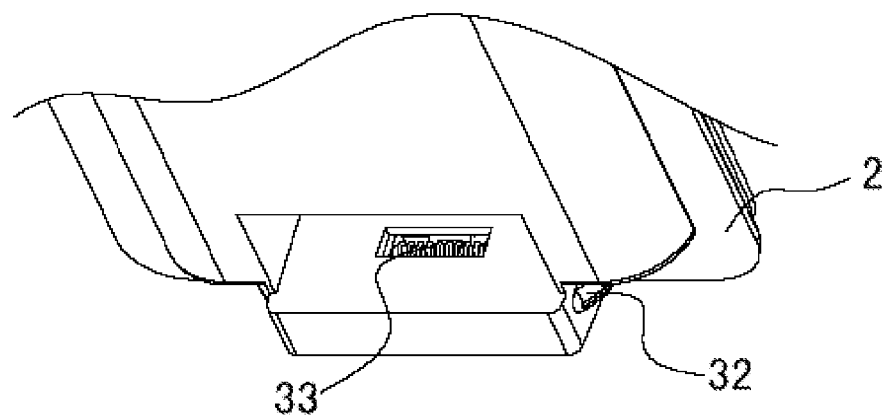
FIG. 9 shows an assembled view of the spring in the embodiment shown in FIG. 2.

When assembling the device as shown in FIG. 7 to FIG. 9, firstly the two battery lock members 32 are inserted into the slot 21 at the bottom of the battery 2, with the horizontal parts of the two battery lock members 32 protruding from the two sides of the slot 21; then the battery latch 31 is installed on the bottom of the battery 2, with the lower end of the battery latch 31 is latched to the vertical parts of the battery lock members 32; at last, the spring 33 is installed from the bottom of the battery 2, and located between the two battery lock members 32. Alternatively, a hole for installing the spring 33 as shown in FIG. 9 may be canceled, and the spring may be attached from the front side.

When attaching the battery 2, the top end (i.e. the first end) of the battery is firstly inserted into the top part of the battery slot on the main body 1, to latch the battery with the main body through the first clamp structure; then the bottom end (i.e. the second end) of the battery is pressed, this cause the outer ends of the horizontal parts of the two battery lock members 32 is pressed by the second clamp 11 on the main body, and then the two horizontal parts of the two battery lock members 32 retract towards each other until their outer ends align with the second clamp 11. At this point, the spring 33 pushes the two battery lock members 32 protruding leftwards and rightwards respectively, to latch the battery 2 into the main body 1, that is, the battery is latched with the main body through the second clamp structure.

When removing the battery 2, the users only need to slightly push the battery latch 31 in the direction as shown in FIG. 2, thus causing the battery lock members retract and release from the second clamp 11. Then the battery 2 maybe released from the second clamp structure through lifting the bottom end of the battery. Then the battery is released from the first clamp structure through taking away the battery towards the back-top direction.

As shown in the foregoing embodiment, the present invention ensures a secure connection between the battery 2 and the main body 1, while the present invention decreases the design requirements, facilitates the operation of the users, and helps to prevent any injury. The foregoing description has presented the preferred embodiment of the present invention, but it is not intended to limit the present invention in any way. Any amendment, equivalent substitute and improvement made within the principals and spirits of the present invention, shall be protected by the present invention.

What is claimed is:
1. A battery latch structure, comprising
  a battery slot for receiving a battery located on a main body of a device powered by said battery;
  a first end of said battery being latched to a first end of said battery slot through a first clamp structure, wherein said first clamp structure includes a first fixed clamp located at the first end of said battery slot, and a first fixed lock member located at the first end of battery;
  a second end of said battery being latched to a second end of said battery slot through a second clamp structure;
  said second clamp structure including a second fixed clamp located on the opposing left and right sides of the second end of said battery slot, a battery latch, a spring and two battery lock members located at a second end of said battery;
    each battery lock member includes a vertical part and a horizontal part, two vertical parts having the spring in-between work in said battery latch to convert upward and downward movements of said battery latch along the direction vertical to the battery's largest-area outside surface to leftward and rightward movements of said battery lock member along the direction from one battery lock member directed to another, thereby the two horizontal parts of said battery lock member move out or in to insert into or released it from the second fixed clamp;

a slot located at a bottom of the battery, the two battery lock members are installed inside the slot with two horizontal parts protruding outside;

wherein, the vertical parts are latched to the battery latch;

the slot located at the bottom of the battery further comprises two symmetrical latching slopes located at a left and right inner sides of said slot, an outer side of the vertical part of each battery lock member is formed with a corresponding latching slope, the battery latch is cooperated with the two battery lock members through their respective slopes.

2. The battery latch structure according to claim 1, wherein said two battery lock members are arranged symmetrically.

3. The battery latch structure according to claim 1, wherein an outer end of the horizontal part of each said battery lock member is formed with a slope for sliding into said second fixed clamp.

4. The battery latch structure according to claim 1, wherein an inner side of the vertical part of each said battery lock member is provided with a pin for installing said spring, both ends of said spring are located on said pins respectively.

\* \* \* \* \*